(12) United States Patent
Giebel et al.

(10) Patent No.: US 11,180,040 B2
(45) Date of Patent: Nov. 23, 2021

(54) CHARGING DEVICE FOR ELECTRICALLY CHARGING AND DISCHARGING A TRACTION BATTERY OF AN ELECTRIC CAR, AND CHARGING SYSTEM FOR SAME

(71) Applicant: VOLKSWAGEN AKTIENGESELLSCHAFT, Wolfsburg (DE)

(72) Inventors: Jan Giebel, Braunschweig (DE); Ralf Pfennigwerth, Lehre (DE); Karsten Rowold, Cremlingen (DE); Carsten Busse, Wolfsburg (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 245 days.

(21) Appl. No.: 16/440,237

(22) Filed: Jun. 13, 2019

(65) Prior Publication Data

US 2019/0381906 A1    Dec. 19, 2019

(30) Foreign Application Priority Data

Jun. 13, 2018  (DE) .................... 10 2018 114 085.1

(51) Int. Cl.
| | |
|---|---|
| *B60L 53/14* | (2019.01) |
| *B60L 53/16* | (2019.01) |
| *H02J 7/00* | (2006.01) |
| *B60L 53/51* | (2019.01) |
| *B60L 53/52* | (2019.01) |

(Continued)

(52) U.S. Cl.
CPC ............... *B60L 53/14* (2019.02); *B60L 53/16* (2019.02); *B60L 53/51* (2019.02); *B60L 53/52* (2019.02); *H02J 7/00* (2013.01); *H02J 7/0045* (2013.01); *B60L 2210/10* (2013.01); *B60Y 2200/91* (2013.01); *B60Y 2300/91* (2013.01); *H02J 7/34* (2013.01); *H02J 7/35* (2013.01); *H02J 2207/20* (2020.01)

(58) Field of Classification Search
CPC ....................................................... B60L 53/16
USPC .......................................................... 320/109
See application file for complete search history.

(56) References Cited

U.S. PATENT DOCUMENTS

| | | | |
|---|---|---|---|
| 9,559,521 B1 * | 1/2017 | King ........................ | H02J 3/382 |
| 2006/0006850 A1 * | 1/2006 | Inoue .................. | H02J 2207/20 |
| | | | 323/265 |

(Continued)

FOREIGN PATENT DOCUMENTS

DE    10 2012 212 291 A1    2/2014

*Primary Examiner* — Jerry D Robbins
(74) *Attorney, Agent, or Firm* — Pearl Cohen Zedek Latzer Baratz LLP (57) ABSTRACT

A charging device for electrically charging and discharging a traction battery in an electric vehicle, comprises a first DC-DC converter; a vehicle plug; a power plug or network connection; a rectifier; a second DC-DC converter; a connection node; wherein the first DC-DC converter can be coupled with a DC power source and is coupled with the connection node; the rectifier can be coupled with the power plug and is coupled with the second DC-DC converter; and the connection node is coupled with the vehicle plug. The object of providing such a charging device with improved efficiency is achieved in that the connection node is connected between the second DC-DC converter and the vehicle plug.

8 Claims, 5 Drawing Sheets

(51) Int. Cl.
*H02J 7/35* (2006.01)
*H02J 7/34* (2006.01)

(56) References Cited

U.S. PATENT DOCUMENTS

| | | | |
|---|---|---|---|
| 2012/0319495 A1* | 12/2012 | Muller | H02M 7/48 307/82 |
| 2015/0061606 A1* | 3/2015 | Pan | H02M 7/19 322/7 |
| 2016/0159250 A1* | 6/2016 | Meng | B60M 1/307 191/2 |
| 2018/0138730 A1* | 5/2018 | Fuchs | H02J 7/0027 |
| 2019/0168630 A1* | 6/2019 | Mrlik | H02J 7/0013 |

* cited by examiner

ND DISCHARGING A
CHARGING DEVICE FOR ELECTRICALLY CHARGING AND DISCHARGING A TRACTION BATTERY OF AN ELECTRIC CAR, AND CHARGING SYSTEM FOR SAME

CROSS REFERENCE TO RELATED APPLICATION

This application claims priority from German Patent Application No. 10 2018 114 085.1, filed Jun. 13, 2018, which is incorporated by reference in its entirety.

FIELD OF THE INVENTION

The invention relates to a charging device electrically charging and discharging a traction battery of an electric car, and a charging system for same.

BACKGROUND OF THE INVENTION

Charging stations are known in the art that enable DC charging of traction batteries in electric cars in which direct current from the charging station is fed directly into the traction battery. The DC power is provided, for example, by a rectifier in the charging station that is coupled with the public AC network or by buffer batteries that are coupled with solar modules. In the electric car, there is only one battery management system which communicates with the charging station in order to adjust the charging amperage and charging voltage to be supplied by the charging station and to stop the charging when the battery is fully charged. The power electronics are located in the charging station.

A device for the electrical DC fast charging of an energy storage device is known from category-defining DE 10 2012 212 291 A1. The device has an AC-DC converter module, a DC-DC converter module, and an interface module for coupling electrical energy into the energy storage device. The AC-DC converter module is electrically coupled directly with an electrical power supply network. The DC-DC converter module is electrically coupled directly with the AC-DC converter module. The interface module is electrically coupled directly with the DC-DC converter module. The DC-DC converter module has a DC-DC boost/buck converter module without galvanic isolation and a DC-DC resonant converter module for galvanic isolation. Electric power is coupled into and out of the energy storage device by means of the interface module. The output voltage and the charging current of the interface module are set by means of the output voltage of the DC-DC boost/buck converter module without galvanic isolation. An additional bidirectional DC-DC boost/buck converter module is electrically coupled directly with the AC-DC converter, which charges or discharges a stationary electrical energy storage device. This additional DC-DC boost/buck converter module is also electrically coupled directly with the DC-DC boost/buck converter module of the DC-DC converter module. The energy storage device is part of an electric vehicle. This known device thus has a connection node with which the AC-DC converter module, the DC-DC boost/buck converter module of the DC-DC converter module, and the additional DC-DC boost/buck converter module are coupled directly together.

In this known device, the connection node is connected between the AC-DC converter module and the DC-DC/DC boost/buck converter module of the DC-DC converter module and hence coupled with the interface module via the DC-DC/DC boost/buck converter module of the DC-DC converter module and the DC-DC resonant converter module.

SUMMARY OF THE INVENTION

The invention is based on the object of providing a charging device for the electrical charging and discharging of a traction battery in an electric vehicle with improved efficiency, and a charging system for same.

The object underlying the invention is achieved by a charging device and a charging system for the electrical charging and discharging of a traction battery in an electric vehicle with the features of the independent claims. Advantageous embodiments of the invention are described in the dependent claims.

According to a first aspect, the invention proposes a charging device for the electrical charging and discharging of a traction battery in an electric vehicle, comprising
a first DC-DC converter;
a vehicle plug that is particularly designed to be connected and/or suitable and/or intended for being connected to the traction battery;
a power plug or connector that is particularly designed to be connected and/or suitable and/or intended for being connected to an AC network;
a rectifier;
a second DC-DC converter;
a connection node; wherein
the first DC-DC converter can be coupled with a DC power source and is coupled with the connection node;
the rectifier can be coupled with the power plug and is coupled with the second DC-DC converter;
the connection node is coupled with the vehicle plug;
the connection node being connected between the second DC-DC converter and the vehicle plug.

According to a second aspect, the invention proposes a charging system for the electrical charging and discharging of a traction battery in an electric vehicle, comprising
a DC power source;
the charging device according to the invention; wherein
the first DC-DC converter is coupled with the DC power source.

Since, according to the invention, the connection node is connected between the second DC-DC converter and the vehicle plug, the efficiency when charging the traction battery from any DC power source and when discharging the traction battery to any DC power source is enhanced in comparison to the device that is known from DE 10 2012 212 291 A1. After all, this charging and discharging takes place according to the invention via the following chain: DC power source>DC-DC converter>connection node>vehicle plug>traction battery, whereas, according to the teaching of DE 10 2012 212 291 A1 it takes place via the following chain: stationary energy storage device>additional DC-DC boost/buck converter module>connection node>DC-DC boost/buck converter module of the DC-DC converter module>DC-DC resonant converter module>interface module>energy storage device.

The invention dispenses with galvanic isolation during the charging of the traction battery from a DC power source, since the security requirement of the IT network with which the charging of the traction battery is controlled in a known manner e.g., according to the "CHAdeMO" or "CCS" systems (abbreviation for "Combined Charging System") is already satisfied. This prevents losses resulting from galvanic isolation and improves the overall efficiency of the system.

Since the invention dispenses with galvanic isolation when charging the traction battery from a DC power source, boosting that is independent of the performance of the galvanic isolation becomes possible. "Boosting" is to be understood here as the charging of the traction battery and/or of another DC sink from at least two current sources at the same time or together.

In principle, the topology of this invention enables any DC sink, including the traction battery, to be charged from any DC power source, including the traction battery. In addition, any DC power source, including the traction battery, can provide power to the AC network, and any DC sink, including the traction battery, can draw power from the grid. Any energy flows, directions, and amperages can be realized, for which reason this invention is a "multidirectional charging system."

The electric vehicle can be embodied in any manner as required—for example as a pedelec or electric scooter or electric motorcycle or electric car.

The traction battery can be configured in any manner as required and has a rated voltage of 450 V or greater for use in an electric car, for example.

The AC network can be configured in any manner as required, for example as a single-phase AC network with a rated voltage of 230 V or as a three-phase AC network or three-phase network with a rated voltage of 400 V.

Each DC-DC converter can be configured in any manner as required, for example as a DC-DC converter without galvanic isolation and/or as a synchronous converter.

Preferably, first DC-DC converter, connection node, and vehicle plug, and/or rectifier, second DC-DC converter, connection node, and vehicle plug form a respective series circuit.

In one embodiment of the invention, it is specified that
the charging device has a first switch;
this switch is connected between the connection node and the vehicle plug.

By opening this switch, both the positive and the negative connection line between connection node and vehicle plug can be mechanically or galvanically separated and an emergency and safety shutdown of the traction battery hence ensured, which provides additional security in the event of an error.

This switch can be configured in any manner as required—for example as a two-pole switch that can mechanically or galvanically separate both the positive and the negative connection line between connection node and vehicle plug, or such that it has two single-pole switches, one of which can mechanically or galvanically separate the positive connection line and the other of which can mechanically or galvanically separate the negative connection line between connection node and vehicle plug. Preferably, this two-pole switch or each of these single-pole switches has a relay or a contactor.

Preferably, connection node, first switch, and vehicle plug form a series circuit.

In one embodiment of the invention, it is specified that
the charging device has a second switch;
this switch is connected in parallel to the second DC-DC converter.

By closing this switch, both the positive and the negative contacts of this DC-DC converter can be connected directly to one another or short-circuited, thereby bridging over this DC-DC converter in the event that this DC-DC converter is not required for a current charging or discharging process. This may be the case, for example, if the DC power source is to be discharged into the AC network, or if the DC power source is also a DC sink and is to be charged from the AC network. After all, the first DC-DC converter can take over the voltage matching between AC network or rectifier and DC power source. The efficiency is further increased as a result.

This switch can also be configured in any manner as required, for example as a two-pole switch that can selectively connect both the positive and the negative contacts of this DC-DC converter directly to one another or short-circuit them and separate them mechanically or galvanically or electronically from one another, or such that it has two single-pole switches, one of which can selectively connect the positive contacts and the other the negative contacts of this DC-DC converter directly to one another or short-circuit them and separate them mechanically or galvanically or electronically. Preferably, this two-pole switch, or each of these single-pole switches, has a relay or a contactor or a semiconductor switch.

As needed, the first switch can be opened before this switch is closed.

Alternatively or in addition, it is specified in this embodiment of the invention that
the charging device has an additional switch;
this switch is connected in parallel to the first DC-DC converter.

By closing this switch, both the positive and the negative contacts of this DC-DC converter can be connected directly to one another or short-circuited, thereby bridging over this DC-DC converter in the event that this DC-DC converter is not required for a current charging or discharging process. This may be the case, for example, if the DC power source is to be discharged into the AC network, or if the DC power source is also a DC sink and is to be charged from the AC network. After all, the second DC-DC converter can take over the voltage matching between AC network or rectifier and DC power source. The efficiency is further increased as a result.

This switch can also be configured in any manner as required, for example as a two-pole switch that can selectively connect both the positive and the negative contacts of this DC-DC converter directly to one another or short-circuit them and separate them mechanically or galvanically or electronically from one another, or such that it has two single-pole switches, one of which can selectively connect the positive contacts and the other the negative contacts of this DC-DC converter directly to one another or short-circuit them and separate them mechanically or galvanically or electronically. Preferably, this two-pole switch, or each of these single-pole switches, has a relay or a contactor or a semiconductor switch.

As needed, the first switch can be opened before this switch is closed.

In one embodiment of the invention, it is specified that
the charging device has a DC-DC converter with galvanic isolation;
the DC-DC converter with galvanic isolation is connected between the second DC-DC converter and the connection node or between the rectifier and the second DC-DC converter.

The DC-DC converter with galvanic isolation and the second DC-DC converter thus form a series circuit that is connected between the rectifier and the connection node. In an alternative embodiment, it is possible to dispense with the second DC-DC converter and to use the DC-DC converter with galvanic isolation for voltage matching as well. However, the embodiment according to the invention with a second DC-DC converter is preferred.

Preferably, rectifier, series circuit, and connection node form a series connection.

For example, the galvanic isolation between AC network and vehicle plug that is provided by this DC-DC converter may be required in order to protect an IT network of the electric vehicle that is responsible for charging and discharging the traction battery.

One advantage of the inventive placement of the galvanic isolation is that an effective boosting of the charging power can be made possible. In domestic applications, the charging power is normally limited by the house connection to the AC network, which is typically 22 kW in Germany. In the topology of this invention, however, the DC power source—and additional DC power sources, if needed—can be added, so that the charging power can be as high as the power of all sources combined. Nor does the galvanic isolation have to be designed for the maximum boost power in order to achieve this, since only the power of the house connection flows through it. This is illustrated by the following sample calculations. In Germany, a house connection has a typical charging power of 22 kW, and home energy storage with a battery capacity of 10 kWh, for example, is assumed as a DC power source. The charging power of the house connection can thus be increased for one hour through boosting from the home energy storage to 32 kW, which corresponds to an increase of about 45%. In Italy, a house connection has a typical charging power of 3 kW, and home energy storage with a battery capacity of 10 kWh, for example, is assumed as a DC power source. The charging power of the house connection can thus be increased for one hour through boosting from the home energy storage to 13 kW, which corresponds to an increase of over 300%. Preferably, the home energy storage batteries are charged when no electric vehicle is connected to the charging system and the house connection thus has only a small load.

This DC-DC converter can be configured in any manner as required, for example as a flyback converter, which is also referred to as a high-buck converter, or as a single-ended flow converter or push-pull flow converter, or as a resonant converter.

In one embodiment of the invention, it is specified that
the charging device has a third switch;
in a first case, this switch is connected in parallel to the DC-DC converter with galvanic isolation or, in a second case, in parallel to the series connection of DC-DC converter to galvanic isolation and second DC-DC converter.

By closing this switch, in the first case, both the positive and the negative contacts of the DC-DC converter with galvanic isolation can be connected to one another or short-circuited, whereby this DC-DC converter is bypassed, or, in the second case, both the positive and negative contacts of the series connection can be connected directly or short-circuited, whereby the series connection can be bridged in the event that the DC-DC converter with electrical isolation is not needed for a current charging or discharging process. This may be the case, for example, if the DC power source is to be discharged into the AC network, or if the DC power source is also a DC sink and is to be charged from the AC network. After all, an IT network of the electric vehicle that is responsible for charging and discharging the traction battery is not necessary here. The efficiency is further increased as a result.

This switch can be configured in any manner as required, for example as a two-pole switch which, in the first case, is able to selectively connect together directly or short-circuit and mechanically or galvanically or electronically separate both the positive and the negative contacts of the DC-DC converter with galvanic isolation or, in the second case, both the positive and the negative contacts of the series connection, or such that it has two single-pole switches, one of which, in the first case, can selectively connect together directly or short-circuit and mechanically or galvanically or electronically separate the positive contacts and the other the negative contacts of the DC-DC converter, or, in the second case, one can selectively connect together directly or short-circuit and mechanically or galvanically or electronically separate the positive contacts and the other the negative contacts of the series connection. Preferably, this two-pole switch or each of these single-pole switches has a relay or a contactor.

The first switch is preferably opened before this switch is closed in order to ensure reliable separation of the traction battery, since there would be no IT network for the electric vehicle in this case.

In one embodiment of the invention, it is specified that
the charging device has at least one additional DC-DC converter;
each additional DC-DC converter can be coupled with an additional DC power source and is coupled with the connection node.

Each of the additional DC-DC converters can be configured in any manner as required, for example as DC-DC converters without galvanic isolation and/or as synchronous converters.

Each of the DC power sources can be configured in any manner as required, for example such that it also represents a DC sink, such as is the case with a home energy storage system, for example.

Preferably, each additional DC-DC converter, connection node, and vehicle plug forms a respective series circuit.

In one embodiment of the invention, it is specified that the rectifier is a bidirectional rectifier.

The bidirectional rectifier can be configured in any manner as required and operates in a known manner both as a rectifier when at least one of the DC sinks draws power from the AC network and as an inverter when at least one of the DC sinks is feeding power to the AC network.

In one embodiment of the charging system according to the invention, it is specified that
the charging system has at least one additional DC power source;
the charging device has an additional DC-DC converter for each additional DC power source;
each additional DC-DC converter is coupled with the respective additional DC power source and with the connection node.

In one embodiment of the charging system according to the invention, it is specified that at least one of the DC power sources is a photovoltaic system and/or a wind turbine generator and/or a combined heat and power plant and/or an emergency generating set and/or a system for an uninterruptible power supply, which is also referred to as a UPS system, and/or a traction battery of another electric vehicle and/or a home energy storage system. The home energy storage system preferably has at least one accumulator and/or at least one supercapacitor.

The embodiments and explanations concerning one of the aspects of the invention also apply analogously to the other aspects of the invention.

BRIEF DESCRIPTION OF THE DRAWINGS

There are now a variety of ways to advantageously configure and develop the charging device according to the invention and the charging system according to the invention. Reference is made firstly to the claims that are subordinated to the independent patent claims. In the following, a preferred embodiment of the invention may be explained in more detail with reference to the drawings and the associated description. In the drawing:

DETAILED DESCRIPTION OF THE INVENTION

Figure 1:
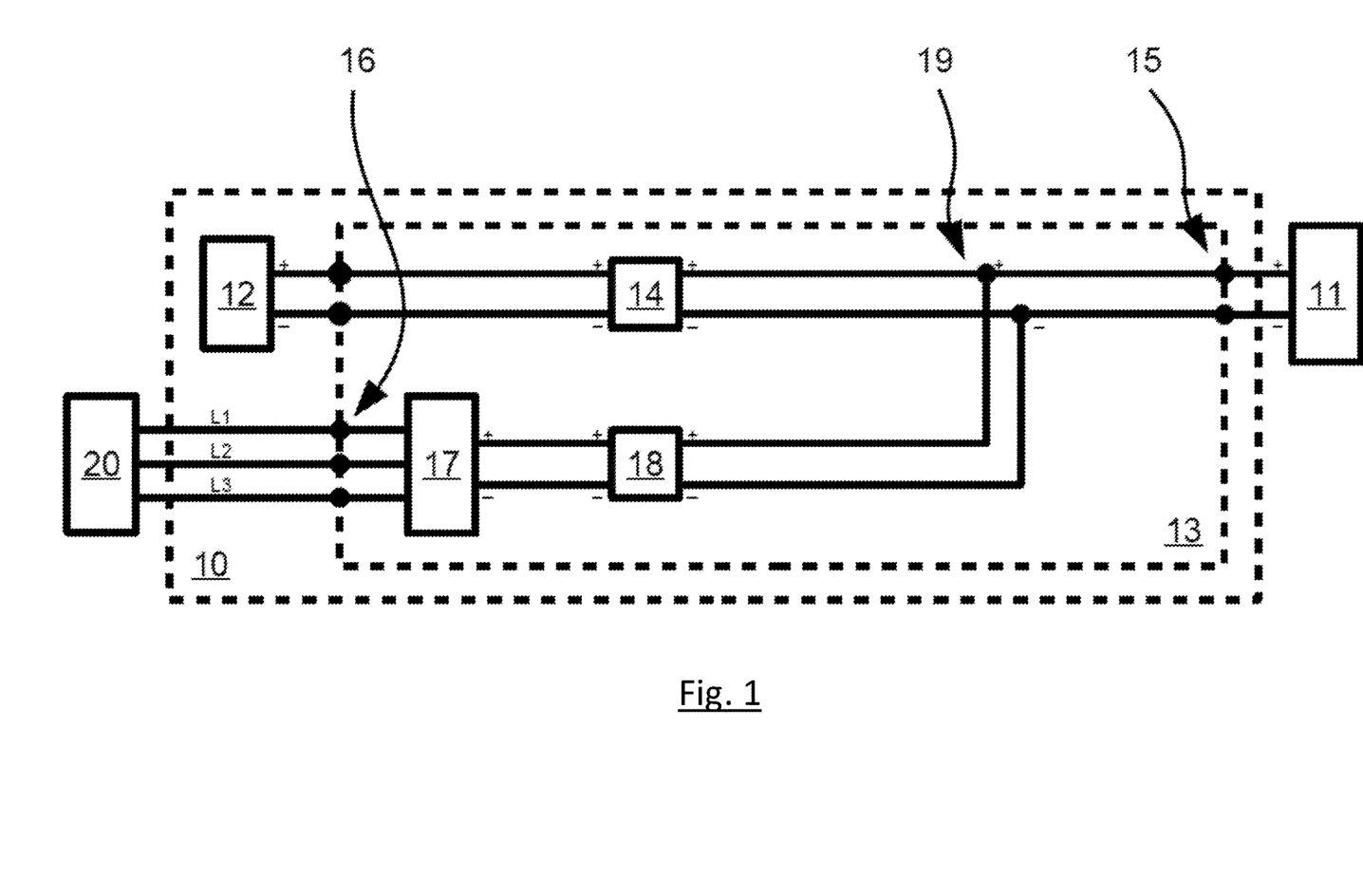
FIG. 1 shows a first embodiment of a charging system according to the invention with a first embodiment of a charging device according to the invention for electrically charging and discharging a traction battery in an electric vehicle.

In FIG. 1, a first embodiment of a charging system 10 according to the invention for electrically charging and discharging a traction battery 11 is shown schematically in an electric vehicle. The charging system 10 has a DC power source 12 and a charging device 13 according to the invention that is designed according to a first embodiment.

The charging device 13 has a control device (not shown), a first DC-DC converter 14, a vehicle plug 15, a power plug 16, a rectifier 17, a second DC-DC converter 18, and a connection node 19.

The first DC-DC converter 14 is coupled with the DC power source 12 and with the connection node 19. The power plug 16 is coupled with an AC network 20. The rectifier 17 is coupled with the power plug 16 and with the second DC-DC converter 18. the connection node 19 is connected between the second DC-DC converter and the vehicle plug. Thus, the connection node 19 is coupled directly with the vehicle plug 15. The vehicle plug 15 is coupled with the traction battery 11. The control device is coupled with DC-DC converter 14, rectifier 17, and DC-DC converter 18 for proper control thereof.

The DC power source 12 is exemplified by a photovoltaic system. The rectifier 17 is exemplified by a unidirectional rectifier. The AC network 20 is exemplified by a three-phase AC network or three-phase network with a rated voltage of 400 V.

The control device can control the DC-DC converters 14, 18 and the rectifier 17 such that the traction battery 11 is charged from the DC power source 12 ("charge mode 1") or from the AC network 20 ("charge mode 2") or from the DC power source 12 and the AC network 20 together ("boost mode 1").

Figure 2:
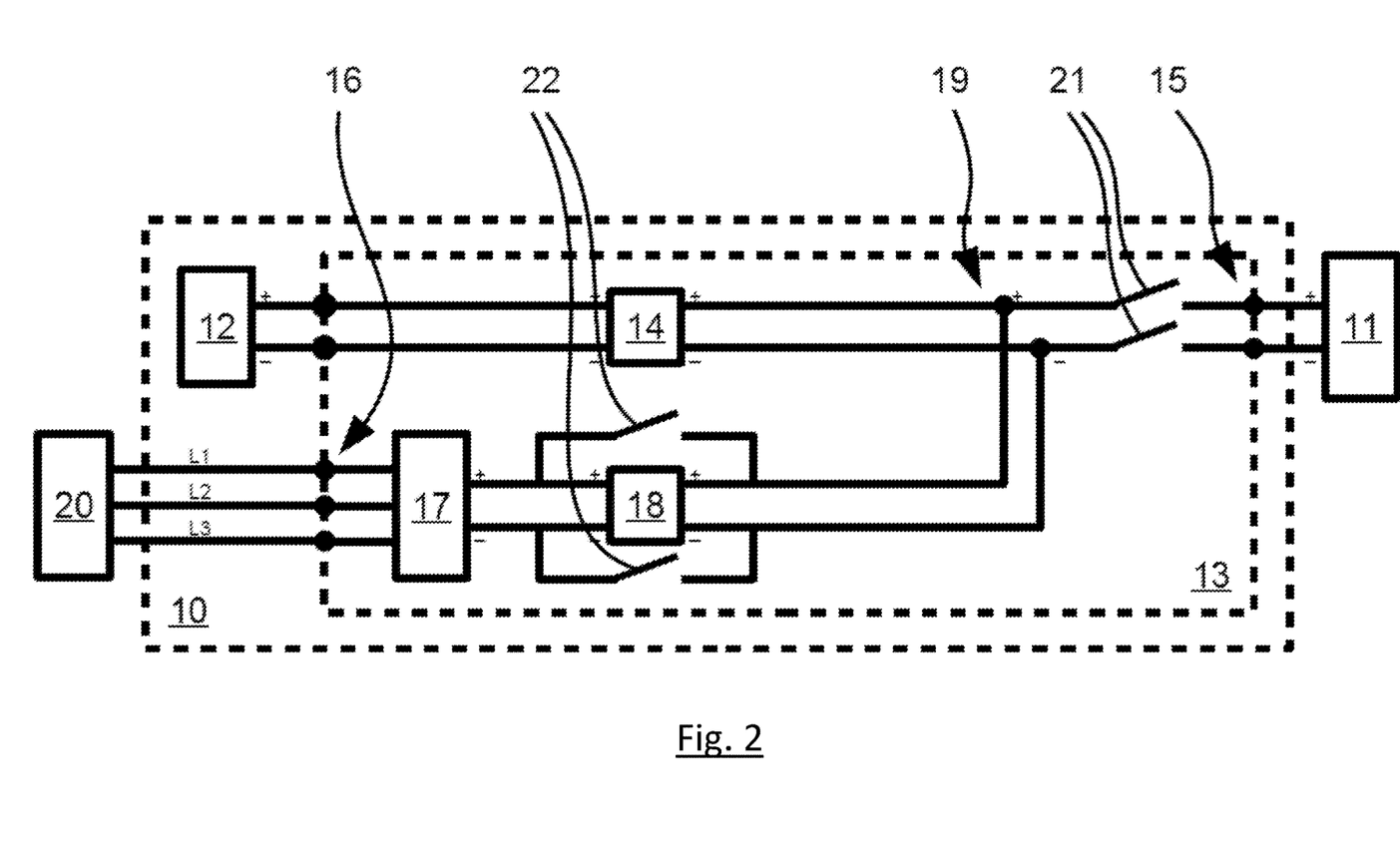
FIG. 2 shows a second embodiment of the charging system with a second embodiment of the charging device.

FIG. 2 shows a schematic illustration of a second embodiment of the charging system 10. This embodiment is similar to the first embodiment, so that especially the differences will be explained in more detail below.

In this embodiment, the charging device 13 is designed according to a second embodiment. This embodiment is similar to the first embodiment, so that especially the differences will be explained in more detail below.

In this embodiment, the rectifier 17 is exemplified by a bidirectional rectifier. Moreover, the charging device 13 has a first switch 21 and a second switch 22. The switch 21 is connected between the connection node 19 and the vehicle plug 15. Connection node 19, switch 21, and vehicle plug 15 are thus connected in series, and the connection node 19 is coupled indirectly, namely via the switch 21, with the vehicle plug 15. The switch 22 is connected in parallel to the DC-DC converter 18. The control device is coupled with the switches 21 and 22.

The first switch 21 is exemplified by a two-pole contactor and can mechanically or galvanically separate both the positive and the negative connecting line between connection node 19 and vehicle plug 15.

By way of example, the second switch 22 has two semiconductor switches that are actuated synchronously and of which one is shown at the top in FIG. 2 and the other at the bottom. The DC-DC converter 18 has two positive contacts, which are shown in FIG. 2 on the square 18 at the top-left and top-right, and two negative contacts, which are shown in FIG. 2 on the square 18 to the bottom-left and bottom-right. The upper semiconductor switch can selectively connect the positive contacts of the DC-DC converter 18 directly to one another or short-circuit and electronically separate them, and the lower semiconductor switch can selectively connect the negative contacts of the DC-DC converter 18 directly to one another or short-circuit and electronically separate them.

The control device can control the DC-DC converters 14, 18, the rectifier 17, and the switches 21, 22 in such a way
that the traction battery 11 is charged from the DC power source 12 ("charge mode 1") or from the AC network 20 ("charge mode 2") or from the DC power source 12 and the AC network 20 together ("boost mode 1"), or
that the traction battery 11 ("discharge mode 1") or the DC power source 12 ("discharge mode 2") or the traction battery 11 discharges together with the DC power source ("discharge mode 3") into the AC network 20.

The control device is embodied such that it
closes the switch 21 and opens or closes the switch 22 in charge mode 1,
closes the switch 21 and opens the switch 22 in charge mode 2, boost mode 1, discharge mode 1, and discharge mode 3, and
opens the switch 21 and closes the switch 22 in discharge mode 2.

To wit, in discharge mode 2, the first DC-DC converter 14 takes over the voltage matching of the DC power source 12 to the rectifier 17, so that the second DC-DC converter 18 is not necessary.

Figure 3:
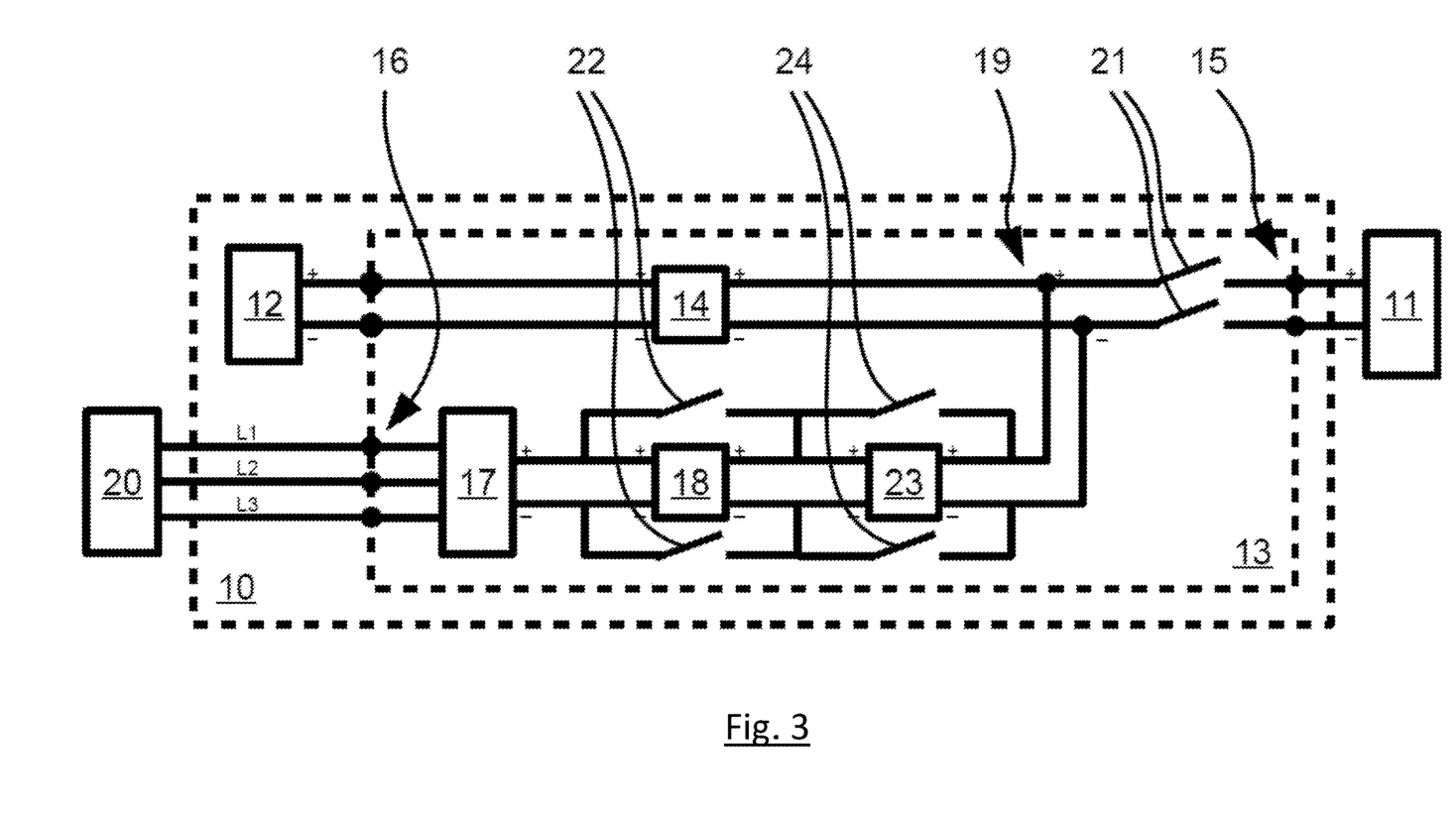
FIG. 3 shows a third embodiment of the charging system with a third embodiment of the charging device.

FIG. 3 shows a schematic illustration of a third embodiment of the charging system 10. This embodiment is similar to the second embodiment, so that especially the differences will be explained in more detail below.

In this embodiment, the charging device 13 is designed according to a third embodiment. This embodiment is similar to the second embodiment, so that especially the differences will be explained in more detail below.

In this embodiment, the DC power source 12 is exemplified by a home energy storage system having an accumulator and thus a DC sink at the same time. Moreover, the charging device 13 has a DC-DC converter 23 with galvanic isolation and a third switch 24. DC-DC converter 23 is connected between DC-DC converter 18 and connection node 19. DC-DC converter 18 and DC-DC converter 23 thus form a series circuit and rectifier 17, DC-DC converter 18, DC-DC converter 23, connection node 19, switch 21, and vehicle plug 15 are connected in series. Switch 24 is connected in parallel to the DC-DC converter 23. The control device is coupled with DC-DC converter 23 and switch 24.

By way of example, the third switch 24 has two single-pole contactors that are actuated synchronously and of which one is shown at the top in FIG. 3 and the other at the bottom. The DC-DC converter 23 has two positive contacts, which are shown in FIG. 3 on the square 23 at the top-left and top-right, and two negative contacts, which are shown in FIG. 3 on the square 23 to the bottom-left and bottom-right. The upper contactor can selectively connect the positive contacts of the DC-DC converter 23 directly to one another or short-circuit and mechanically or galvanically separate them, and the lower contactor can selectively connect the negative contacts of the DC-DC converter 23 directly to one another or short-circuit and mechanically or galvanically separate them.

The control device can control the DC-DC converters 14, 18, 23, the rectifier 17, and the switches 21, 22, 24 in such a way that the traction battery 11 is charged from the DC power source 12 ("charge mode 1") or from the AC network 20 ("charge mode 2") or from the DC power source 12 and the AC power 20 together ("boost mode 1"), or that the DC power source 12 is charged from the traction battery 11 ("charge mode 4") or from the AC network 20 ("charge mode 5") or from the traction battery 11 and the AC network 20 together ("boost mode 2"), or that the traction battery 11 ("discharge mode 1") or the DC power source 12 ("discharge mode 2") or the traction battery 11 discharges together with the DC power source ("discharge mode 3") into the AC network 20.

The control device is embodied such that it closes the switch 21, opens or closes the switch 22, and opens the switch 24 in charge mode 1 and charge mode 4, closes the switch 21, opens the switch 22, and opens the switch 24 in charge mode 2, boost mode 1, boost mode 2, discharge mode 1, and discharge mode 3, and opens the switch 21, closes the switch 22, and closes the switch 24 in charge mode 5 and discharge mode 2.

To wit, in charge mode 5 and discharge mode 2, the DC-DC converter 14 takes over the voltage matching of the DC power source 12 to the rectifier 17, so that the DC-DC converter 18 is not necessary. Moreover, in charge mode 5 and discharge mode 2, the switch 21 galvanically separates the traction battery 11 from the charging device 13, so that the DC-DC converter 23 is not necessary.

Figure 4:
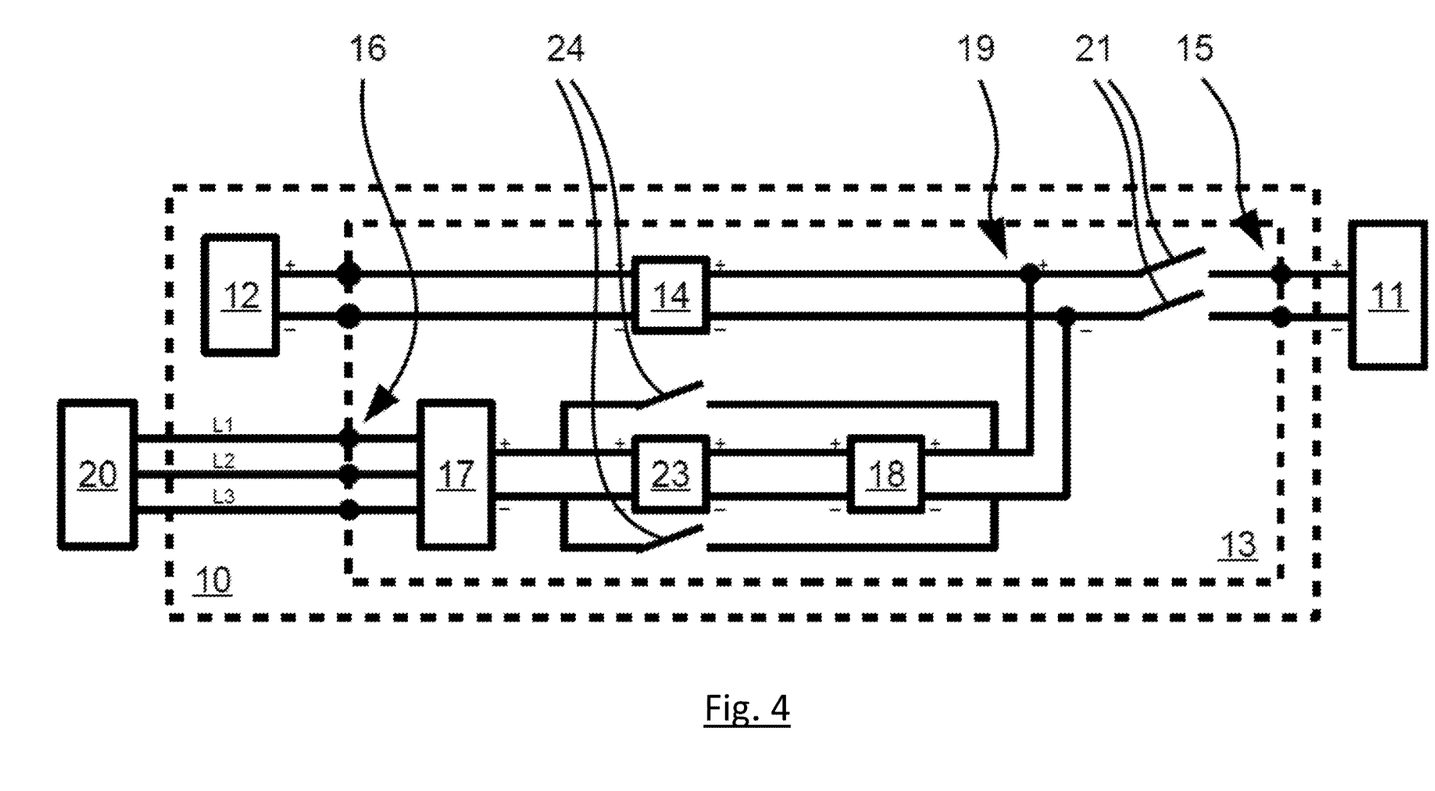
FIG. 4 shows a fourth embodiment of the charging system with a fourth embodiment of the charging device.

FIG. 4 shows a schematic illustration of a fourth embodiment of the charging system 10. This embodiment is similar to the third embodiment, so that especially the differences will be explained in more detail below.

In this embodiment, the charging device 13 is designed according to a fourth embodiment. This embodiment is similar to the third embodiment, so that especially the differences will be explained in more detail below.

In this embodiment, the second switch 22 of the third embodiment is omitted, and the DC-DC converter 23 is connected between the rectifier 17 and the DC-DC converter 18. DC-DC converter 23 and DC-DC converter 18 thus form a series circuit and rectifier 17, DC-DC converter 23, DC-DC converter 18, connection node 19, switch 21, and vehicle plug 15 are connected in series. Moreover, the switch 24 is connected in parallel to the series circuit of DC-DC converter 23 and DC-DC converter 18.

The series circuit of DC-DC converter 23 and DC-DC converter 18 has two positive contacts, which are shown in FIG. 4 on the square 23 at the top-left and on the square 18 at the top-right, and two negative contacts, which are shown in FIG. 4 on the square 23 to the bottom-left on the square 18 to the bottom-right. The upper contactor of the switch 24 can selectively connect the positive contacts of the series circuit 23-18 directly to one another or short-circuit and mechanically or galvanically separate them, and the lower contactor of the switch 24 can selectively connect the negative contacts of the series circuit 23-18 directly to one another or short-circuit and mechanically or galvanically separate them.

The control device can control the DC-DC converters 14, 18, 23, the rectifier 17, and the switches 21, 24 in such a way that the traction battery 11 is charged from the DC power source 12 ("charge mode 1") or from the AC network 20 ("charge mode 2") or from the DC power source 12 and the AC network 20 together ("boost mode 1"), or that the DC power source 12 is charged from the traction battery 11 ("charge mode 4") or from the AC network 20 ("charge mode 5") or from the traction battery 11 and the AC network 20 together ("boost mode 2"), or that the traction battery 11 ("discharge mode 1") or the DC power source 12 ("discharge mode 2") or the traction battery 11 discharges together with the DC power source ("discharge mode 3") into the AC network 20.

The control device is embodied such that it closes the switch 21 and opens the switch 24 in charge mode 1, charge mode 2, charge mode 4, boost mode 1, boost mode 2, discharge mode 1, and discharge mode 3, and opens the switch 21 and closes the switch 24 in charge mode 5 and discharge mode 2.

To wit, in charge mode 5 and discharge mode 2, the DC-DC converter 14 takes over the voltage matching of the DC power source 12 to the rectifier 17, so that the DC-DC converter 18 is not necessary. Moreover, in charge mode 5 and discharge mode 2, the switch 21 galvanically separates the traction battery 11 from the charging device 13, so that the DC-DC converter 23 is not necessary.

Figure 5:
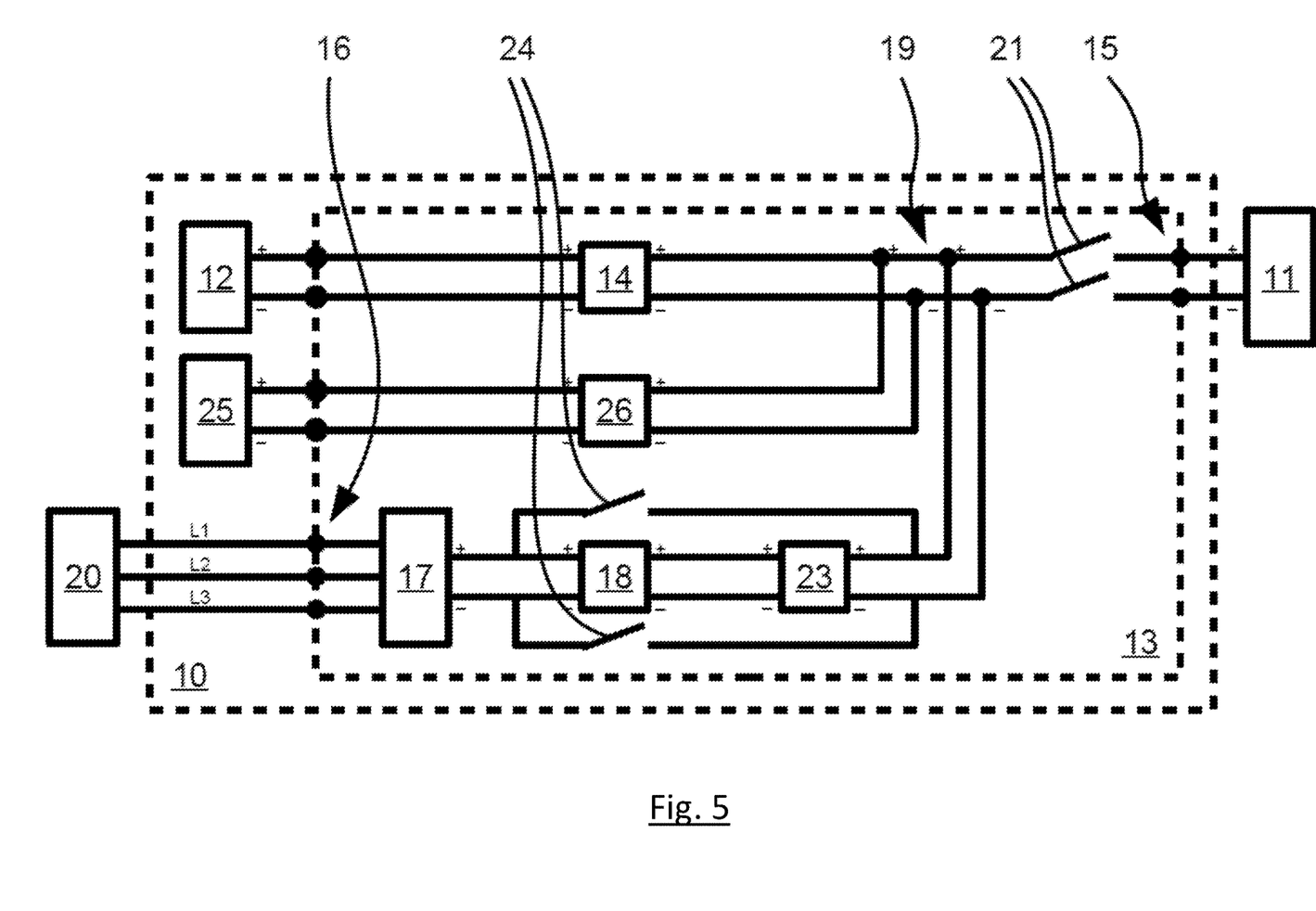
FIG. 5 shows a fifth embodiment of the charging system with a fifth embodiment of the charging device.

FIG. 5 shows a schematic illustration of a fifth embodiment of the charging system 10. This embodiment is similar to the fourth embodiment, so that especially the differences will be explained in more detail below.

In this embodiment, the charging device 13 is designed according to a fifth embodiment. This embodiment is similar to the fourth embodiment, so that especially the differences will be explained in more detail below.

In this embodiment, like in the third embodiment, the DC-DC converter 23 is connected between the DC-DC converter 18 and the connection node 19. Moreover, the charging system 10 has an additional DC power source 25, and the charging device 13 has an additional DC-DC converter 26 for the DC power source 25. The DC power source 25 is exemplified by a photovoltaic system. The control device is coupled with the DC-DC converter 26.

The series circuit of DC-DC converter 18 and DC-DC converter 23 has two positive contacts, which are shown in FIG. 5 on the square 18 at the top-left and on the square 23 at the top-right, and two negative contacts, which are shown in FIG. 5 on the square 18 to the bottom-left on the square 23 to the bottom-right. The upper contactor of the switch 24 can selectively connect the positive contacts of the series circuit 18-23 directly to one another or short-circuit and mechanically or galvanically separate them, and the lower contactor of the switch 24 can selectively connect the negative contacts of the series circuit 18-23 directly to one another or short-circuit and mechanically or galvanically separate them.

The control device can control the DC-DC converters 14, 18, 23, 26, the rectifier 17, and the switches 21, 24 in such a way that the traction battery 11 is charged from the DC power source 12 ("charge mode 1") or from the DC power source 25 ("charge mode 1a") or from the AC network 20 ("charge mode 2") or from the DC power source 12 and the AC network 20 together ("boost mode 1") or from the DC power source 12 and the DC power source 25 together ("boost mode 1a") or from the AC network 20 and the DC power source 25 together ("boost mode 1b") or from the DC power source 12, the AC network 20, and the DC power source 25 together ("boost mode 1c"), or that the direct current source 12 is charged from the traction battery 11 ("charge mode 4") or of the DC power source 25 ("charge mode 4a") or from the AC network 20 ("charge mode 5") or from the traction battery 11 and the AC network 20 together ("boost mode 2") or from the traction battery 11 and the DC power source 25 together ("boost mode 2a") or from the AC network 20 and the DC power source 25 together ("boost mode 2b") or from the traction battery 11, the AC network 20, and the DC power source 25 together ("boost mode 2c"), or that is the traction battery 11 ("discharge mode 1") or the DC power source 12 ("discharge mode 2") or the DC power source 25 ("discharge mode 2a") or the traction battery 11 together with the DC power source 12 ("discharge mode 3") or the traction battery 11 is discharged together with the DC power source 25 ("discharge mode 4") or the DC power source 12 together with the DC power source 25 ("discharge mode 5") or the traction battery 11 together with the DC power source 12 and the DC power source 25 ("discharge mode 6") into the AC network 20.

The control device is embodied such that it closes the switch 21 and opens the switch 24 in charge mode 1, charge mode 1a, charge mode 2, boost mode 1, boost mode 1a, boost mode 1b, boost mode 1c, charge mode 4, boost mode 2, boost mode 2a, boost mode 2c, discharge mode 1, discharge mode 3, discharge mode 4, and discharge mode 6, and opens the switch 21 and closes the switch 24 in charge mode 4a, charge mode 5, boost mode 2b, discharge mode 2, discharge mode 2a, and discharge mode 5.

To wit, in charge mode 4a, the DC-DC converter 14 and the DC-DC converter 26 take over the voltage matching of the DC power source 12 to the DC power source 25; in charge mode 5, boost mode 2b, and discharge mode 2, the DC-DC converter 14 takes over the voltage matching of the DC power source 12 to the rectifier 17; in discharge mode 2a, the DC-DC converter 26 takes over the voltage matching from the DC power source 25 to the rectifier 17; and in discharge mode 5, the DC-DC converters 14 and 26 take over the voltage matching from the DC power sources 12 and 25 to the rectifier 17, so that the DC-DC converter 18 is not required in these modes. Moreover, in charge mode 4a, charge mode 5, boost mode 2b, discharge mode 2, discharge mode 2a, and discharge mode 5, the switch 21 galvanically separates the traction battery 11 from the charging device 13, so that the DC-DC converter 23 is not necessary.

Any of the above-described embodiments can be combined with at least one of the other embodiments as needed.

LIST OF REFERENCE SYMBOLS

10 charging system
11 traction battery
12 DC power source
13 charging device
14 first DC-DC converter
15 vehicle plug
16 power plug
17 rectifier
18 second DC-DC converter
19 connection node
20 AC network
21 first switch
22 second switch
23 DC-DC converter with galvanic separation
24 third switch
25 additional DC power source
26 additional DC-DC converter

The invention claimed is:

1. A charging device for electrically charging and discharging a traction battery in an electric vehicle, comprising
a first DC-DC converter;
a vehicle plug;
a power plug or connection;
a rectifier;
a second DC-DC converter;
a connection node;
wherein the first DC-DC converter can be coupled with a DC power source and is coupled with the connection node;
wherein the rectifier can be coupled with the power plug or connection and is coupled with the second DC-DC converter;
wherein the connection node is coupled with the vehicle plug;
wherein the connection node is connected between the second DC-DC converter and the vehicle plug;
wherein the charging device has a DC-DC converter with galvanic separation, and the DC-DC converter with galvanic isolation is connected between the second DC-DC converter and the connection node or between the rectifier and the second DC-DC converter; and
wherein the charging device has a first switch, and the first switch is connected in parallel to the DC-DC converter with galvanic isolation or in parallel to the DC-DC converter with galvanic isolation and the second DC-DC converter.

2. The charging device as set forth in claim 1, wherein the charging device has a second switch, and the second switch is connected between the connection node and the vehicle plug.

3. The charging device as set forth in claim 2, wherein the charging device has a third switch, and the third switch is connected in parallel to the second DC-DC converter.

4. The charging device as set forth in claim 1, wherein the charging device has an additional DC-DC converter, and the additional DC-DC converter can be coupled with an additional DC power source and is coupled with the connection node.

5. The charging device as set forth in claim 1, wherein the rectifier is a bidirectional rectifier.

6. A charging system for electrically charging and discharging a traction battery in an electric vehicle, comprising:

a DC power source; and a charging device as set forth in claim 1;

wherein the first DC-DC converter is coupled with the DC power source.

7. The charging system as set forth in claim 6, wherein:

the charging system has an additional DC power source;

the charging device has an additional DC-DC converter; and the additional DC-DC converter is coupled with the additional DC power source and is coupled with the connection node.

8. The charging system as set forth in claim 6, wherein at least one of the DC power sources has a photovoltaic system and/or a wind turbine generator and/or a combined heat and power plant and/or an emergency generating set and/or a system for an uninterruptible power supply and/or a home energy storage system.

\* \* \* \* \*